(12) United States Patent
Hashigaya

(10) Patent No.: US 6,257,748 B1
(45) Date of Patent: Jul. 10, 2001

(54) VEHICLE HEADLAMP HAVING AN OUTWARDLY AND BACKWARDLY CURVED LENS

(76) Inventor: Kazuya Hashigaya, c/o Koito Manufacturing Co., Ltd., Shizuoka Works, 500, Kitawaki, Shimizu-shi, Shizuoka (JP)

( * ) Notice: Subject to any disclaimer, the term of this patent is extended or adjusted under 35 U.S.C. 154(b) by 0 days.

(21) Appl. No.: 09/083,242

(22) Filed: May 22, 1998

(30) Foreign Application Priority Data

May 22, 1997 (JP) .................................................. 9-148635

(51) Int. Cl.[7] ........................................................ B60Q 1/00
(52) U.S. Cl. .................... 362/539; 362/240; 362/263; 362/543; 362/544
(58) Field of Search ................................ 362/539, 543, 362/544, 514, 529, 528, 228, 229, 263, 240

(56) References Cited

U.S. PATENT DOCUMENTS

| | | | |
|---|---|---|---|
| 4,849,861 | * | 7/1989 | Arima ...................................... 362/61 |
| 4,972,302 | * | 11/1990 | Masuyama et al. .................... 362/61 |
| 5,107,405 | | 4/1992 | Makita .................................... 362/61 |
| 5,130,904 | | 7/1992 | Ohshio et al. .......................... 362/61 |
| 5,556,190 | | 9/1996 | Saijo ...................................... 362/226 |
| 5,605,392 | | 2/1997 | Daumueller et al. ................ 362/83.3 |
| 5,607,228 | | 3/1997 | Ozaki et al. ........................... 362/263 |
| 5,879,073 | * | 3/1999 | Hori et al. ............................. 362/344 |
| 5,941,633 | * | 8/1999 | Saito et al. ........................... 362/543 |

FOREIGN PATENT DOCUMENTS

| | | | |
|---|---|---|---|
| 0 602 374 A1 | 6/1994 | (EP) | ................ F21Q/1/00 |
| 2 288 459 | 10/1995 | (GB) | ............... F21V/25/00 |

* cited by examiner

Primary Examiner—Stephen Husar
Assistant Examiner—John Anthony Ward
(74) Attorney, Agent, or Firm—Sughrue, Mion, Zinn, Macpeak & Seas, PLLC

(57) ABSTRACT

The right headlamp in a four-lamp type headlamp system is provided in such a manner that its lamp having a discharge bulb which is on the outside as viewed in the direction of width of the vehicle body is positioned at the corner of the front of the vehicle body, and the configuration of the surface of the lens is a curved surface which is curved backwardly and outwardly as viewed in the direction of width of the vehicle body. Furthermore, at the outermost end, as viewed in the direction of width of the vehicle body, of the lens surface, the horizontal component of the normal thereat is inclined at an angle (=about 70°) outwardly as viewed in the direction of width of the vehicle body with respect to the axial line in the front-to-rear direction of the vehicle body. Hence, the sideward open angle can be set to a large value which the straight line connecting the light emitting section of the discharge bulb to the outermost end, as viewed in the direction of width of the vehicle body, of the lens forms with the axial line in the front-to-rear direction of the vehicle body, whereby the direct light beam from the discharge bulb is applied sidewardly of the vehicle, to allow the driver to positively observe, for instance, a shoulder of the road.

19 Claims, 4 Drawing Sheets

VEHICLE HEADLAMP HAVING AN OUTWARDLY AND BACKWARDLY CURVED LENS

BACKGROUND OF THE INVENTION

1. Technical Field of the Invention

The present invention relates to a vehicle headlamp having a discharge bulb, and more particularly to the configuration of the lens of the vehicle headlamp.

2. Related Art

Recently, a discharge bulb has been employed as a light source for a vehicle headlamp because it irradiates with high luminance. The discharge bulb is much higher in power than a halogen lamp or the like. Therefore, it is desirable that a headlamp with a discharge bulb performs the function of a discharge bulb sufficiently—for instance, its irradiation angle is set large.

In general, a pair of headlamps are provided on the right and left of the front end of a vehicle, respectively. A front turn signal lamp or clearance lamp is provided on the outside of each of the headlamps as viewed in the direction of width of the vehicle body, and therefore the headlamps are shifted towards the central axis of the vehicle body as much. Hence, the lens of the conventional headlamp suffers from the following drawbacks: That is, even if the surface configuration of the lens is curved along the front configuration of the front end portion of the vehicle body; more specifically, even if it is extended outwardly as viewed in the direction of width of the vehicle body and somewhat curved backwardly, their angles of inclination to the right and left are not so large. This may be said about a headlamp with a discharge bulb.

In the above-described headlamp, the straight lines connecting the light emitting section of the discharge bulb to the outermost ends (as viewed in the direction of width of the vehicle body) of the lens surface form sideward open angles with respect to the axial line (in the front-to-rear direction) of the vehicle body. Those sideward open angles are relatively small, and cannot be set to a large value.

Hence, heretofore, although the light beam reflected from the reflector irradiates forwardly of the vehicle, it is impossible to employ a method for effectively utilizing the great power of the discharge lamp to emit a light beam directly from the discharge bulb so as to irradiate sidwardly of the vehicle body thereby allowing the driver to see a shoulder of a road sufficiently.

SUMMARY OF THE INVENTION

In view of the foregoing, an object of the invention is to provide a vehicle headlamp having a discharge bulb which effectively utilizes the great power of the discharge bulb.

The foregoing object of the invention can be accomplished by a provision of a vehicle headlamp which, according to the invention, comprises a discharge bulb, a reflector adapted to reflect a light beam forwardly which is emitted from the discharge bulb, and a lens provided in front of the reflector, and the surface configuration of the lens is a curved configuration which is curved outwardly as viewed in the direction of width of a vehicle body and backwardly, and the normal at the outermost end, as viewed in the direction of width of the vehicle body, of the lens is inclined more than 45° outwardly as viewed in the direction of width of the vehicle body with respect to the axial line which is extended in the front-to-rear direction of the vehicle body.

The lens has a curved configuration which is curved outwardly, as viewed in the direction of width of the vehicle body, and backwardly. The particular curved configuration is not limiting.

As was described above, the surface configuration of the lens is a curved configuration which is curved outwardly as viewed in the direction of width of a vehicle body and backwardly. More particularly, the normal at the outermost end, as viewed in the direction of width of the vehicle body, of the lens surface is inclined more than 45° outwardly with respect to the axial line which is extended in the front-to-rear direction of the vehicle body. Hence, the sideward open angle which the straight line connecting the light emitting section of the discharge bulb to the outermost end, as viewed in the direction of width of the vehicle body, of the lens forms with the axial line extended in the front-to-rear direction of the vehicle body, can be set to a relatively large value. Therefore, in addition to the original function of the headlamp that the light beam reflected from the reflector irradiates forwardly of the vehicle, the function can be effectively performed that the direct light beam from the discharge bulb irradiates sidewardly of the vehicle thereby allowing the driver to sufficiently see the shoulder of the road.

Hence, according to the invention, in the vehicle headlamp having the discharge bulb, the great power of the latter can be effectively utilized.

In the invention, the above-described headlamp can be provided at the corner of the front of the vehicle body with ease. Accordingly, not only the headlamp body but also the lighting circuit unit adapted to turn on the discharge bulb can be arranged at the aforementioned corner. This feature increases the spaces in the engine room.

In the case where, as was described above, the headlamp is provided at the corner of the front of the vehicle body, the region below the reflector is liable to become a dead space. Therefore, the light circuit unit is arranged below and near the reflector, so that the dead space in the engine room can be effectively utilized.

If, in this case, the lighting circuit unit is arranged below and near the reflector, then its concrete structure is not particularly limited. That is, for instance the structure that the lighting circuit unit is mounted on the outer surface of the lower wall of the reflector, may be employed. Alternatively, in the case where the headlamp has the lamp body accommodating the reflector, the structure that the lighting circuit unit is mounted on the outer surface of the lower wall of the lamp body, may be employed.

Furthermore, in the vehicle headlamp of the invention, the surface configuration of the lens is a curved configuration which is curved upwardly and backwardly, and at the uppermost end of the surface of the lens, the normal is upwardly inclined more than 45° with respect to the axial line which is extended in the front-to-rear direction of the vehicle body. Hence, in a roundish vehicle such as a sport car type vehicle, the headlamp can be mounted at the corner of the front of the vehicle body with ease.

In the case where the surface of the lens is backwardly curved not only outwardly (as viewed in the direction of width of the vehicle body) but also upwardly, in the engine room a region located below the reflector is liable to become a great dead space. Therefore, it is desirable to arrange the lighting circuit unit below and near the reflector. Furthermore, in this case, the reflector or the outer surface of the lower wall of the lamp body is relatively large in area. Hence, in the case where the lighting circuit unit is mounted on the outer surface of the lower wall, its mounting range is large; that is, the mounting of the lighting circuit unit is high in the degree of freedom.

As was described above, in the case where, at the outermost end (as viewed in the direction of width of the vehicle body) of the surface of the lens or at the uppermost end thereof, the normal is inclined more than 45° outwardly (as viewed in the direction of width of the vehicle body) or upwardly with respect to the axial line, in the front-to-rear direction, of the vehicle body, the above-described effects are obtained. However, if the angle of inclination is larger (for instance more than 60°), then the effects are more significant.

Moreover, in the vehicle headlamp of the invention, the shade is provided in front of the discharge bulb which intercepts a direct light beam which advances forwardly from the discharge bulb, and the sideward light passage space through which a direct light beam passes which advances sidewards from the discharge bulb is formed between the shade and the outermost end, as viewed in the direction of width of the vehicle body, of the reflector. In this case, the forward direct light beam is cut which is undesirable in the light distribution of the lamp, and the direct light beam irradiates sidewardly which passes through the aforementioned sideward light passage space and through the lens.

PREFERRED EMBODIMENT OF THE INVENTION

A vehicle headlamp, which constitutes a preferred embodiment of the invention, will be described with reference to the accompanying drawings.

Figure 1:
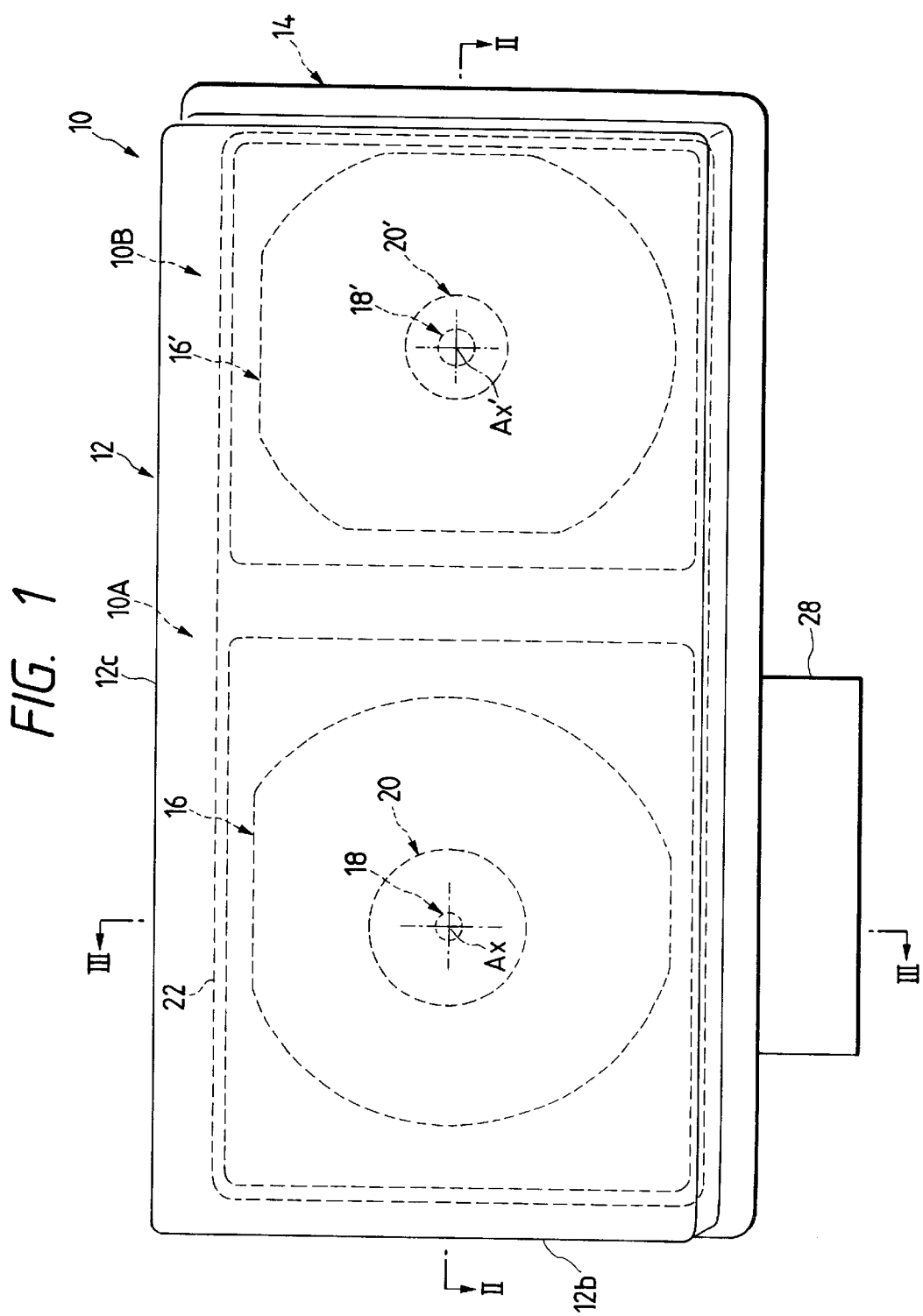
FIG. 1 is a front view of a vehicle headlamp, which constitutes a preferred embodiment of the invention.
Figure 2:
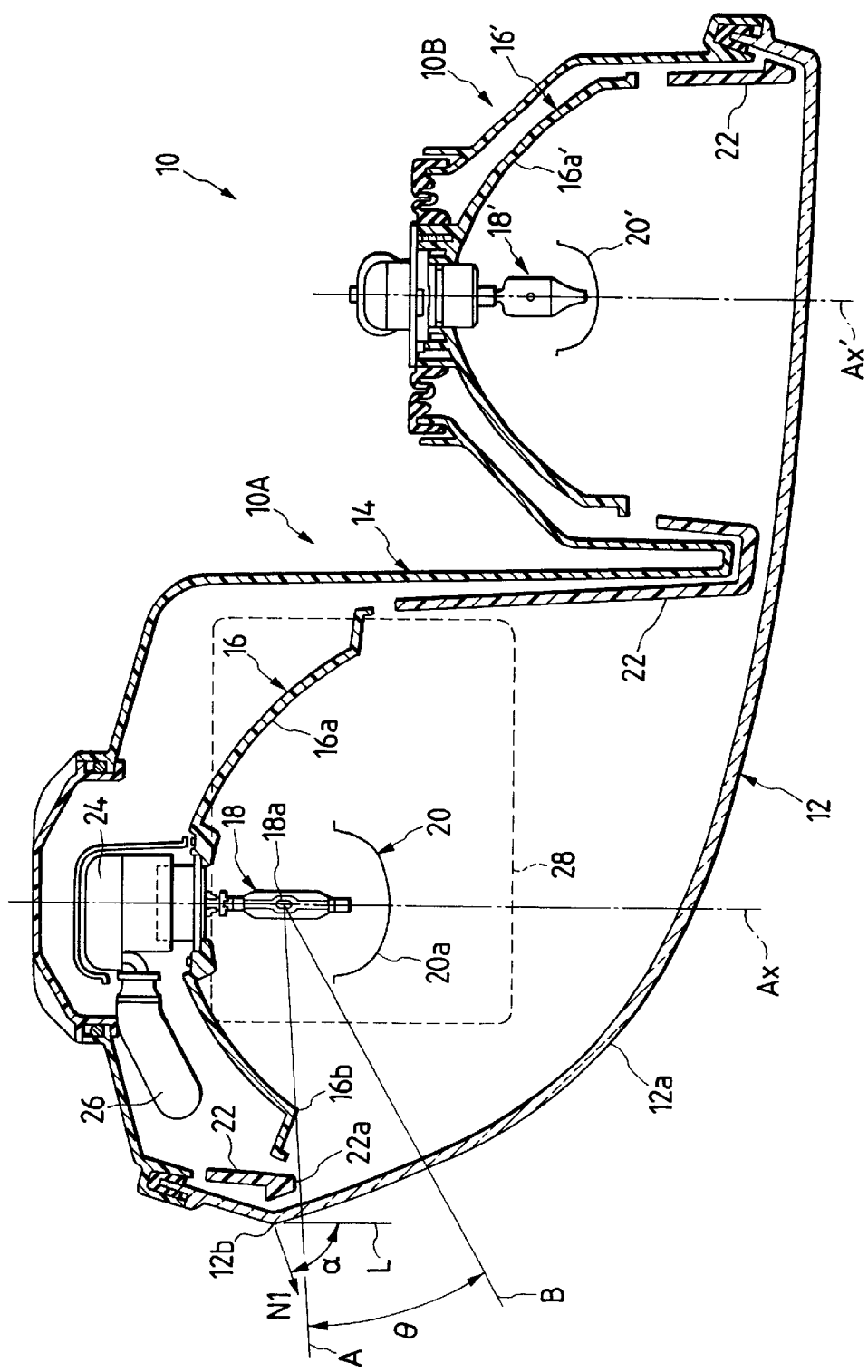
FIG. 2 is a sectional view taken along line II—II in FIG.1.
Figure 3:
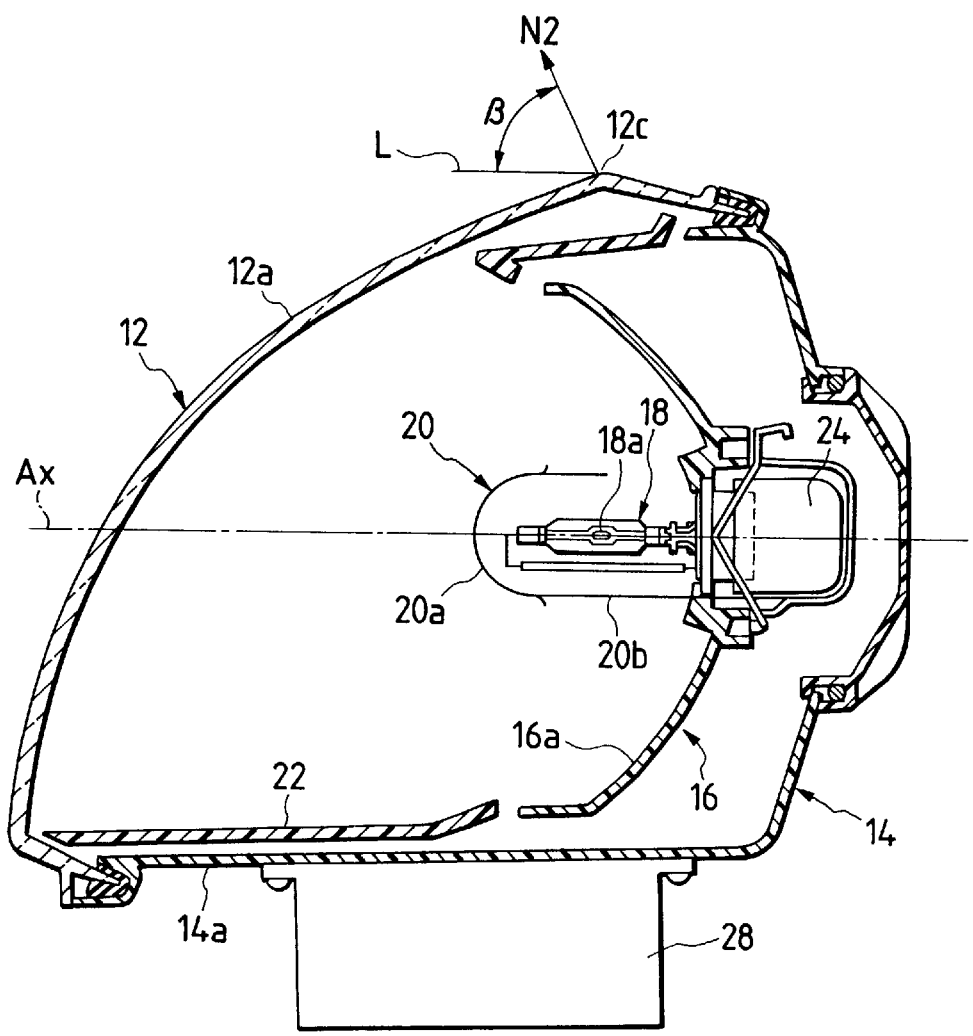
FIG. 3 is a sectional view taken along line III—III in FIG. 1.

FIG. 1 is a front view of the vehicle headlamp, the embodiment of the invention. FIG. 2 is a sectional view taken along line II—II in FIG. 1. FIG. 3 is a sectional view taken along line III—III in FIG. 1.

In those figures, reference numeral 10 designates the headlamp, the embodiment of the invention. That is, the headlamp 10 is a so-called "four-lamp type headlamp, which is installed on the right side of a vehicle body. The headlamp 10 comprises two lamps 10A and 10B. With the headlamp 10, when the two lamps 10A and 10B are turned on at the same time, a main lamp light distribution pattern is formed; and when the lamp 10A is turned on, an auxiliary light distribution pattern is formed.

The lamp 10A is so designed that a lens 12 and a lamp body 14 form right and left spaces. Of the spaces thus formed, the one which is located outside as viewed in the direction of width of the vehicle body accommodates a reflector 16 having a discharge bulb 18 and a shade 20 in such a manner that the reflector 16 is tiltable right and left. On the other hand, the lamp 10B is designed as follows: The other space which is located outside as viewed in the direction of width of the vehicle body, accommodates a reflector 16' having a halogen bulb 18' and a shade 20' in such a manner that the reflector 16' is tiltable upwardly and downwardly and right and left.

The aforementioned lens is a transparent lens, and the aforementioned light distribution patterns are formed by the reflectors 16 and 16'. That is, the reflecting surface 16a of the reflector 16 is made up of a plurality of reflecting surface elements which are formed with a predetermined curvature with a rotary paraboloid as a reference surface whose central axis is an optical axis Ax; and similarly the reflecting surface 16a' of the reflector 16' is made up of a plurality of reflecting surface elements which are formed with a predetermined curvature with a rotary paraboloid as a reference surface whose central axis is an optical axis Ax'. Those reflecting surface elements forwardly diffusion-reflect or diffusion-reflect the output light beams of the discharge bulb 18 and the halogen bulb 18', to obtain the aforementioned light distribution patterns.

The aforementioned discharge bulb 18 is a metal halide discharge bulb, and it is mounted on the reflector 16 in such a manner that its optical axis (reference axis) is coincident with the aforementioned optical axis Ax, and its light emitting section (arc) 18a is located slightly before the focal point of the rotary paraboloid which is the reference surface. In order to turn on the discharge bulb 18, it is necessary to provide a high voltage. Therefore, the discharge bulb 18 is connected through a bulb socket 24 and a high voltage cord to a lighting circuit unit 28. The lighting circuit unit 28 is fixedly mounted on the outer surface of a lower portion 14a of the lamp body 14 with screws.

The aforementioned shade 20 comprises a cup-shaped shade body which is provided in front of the discharge bulb 18, and a leg 20b which is extended backwardly from the shade body 20a and secured to the reflector 16. The shade body 20a intercepts a forward light beam emitted directly from the discharge bulb 18.

Figure 4:
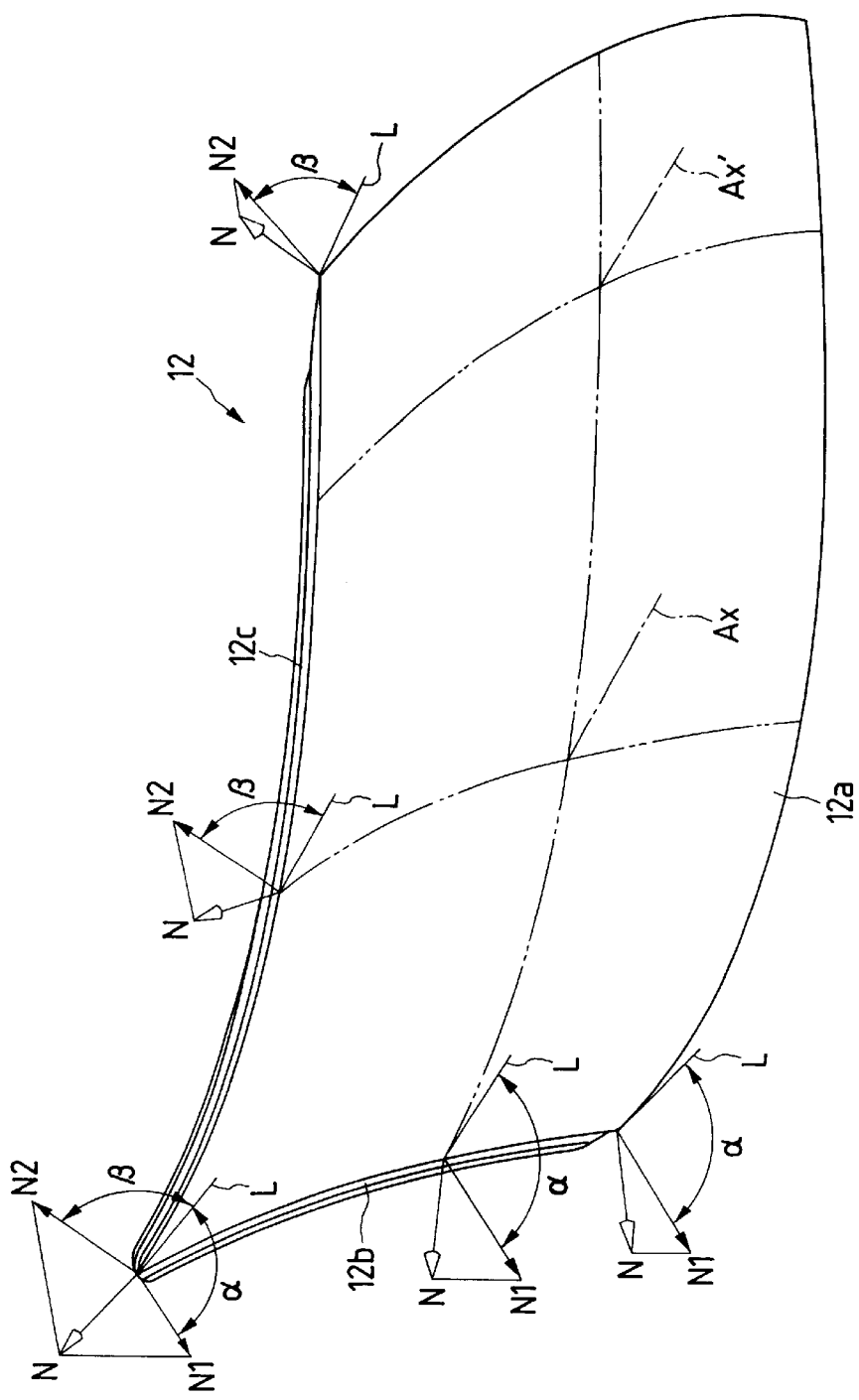
FIG. 4 is a perspective view of the lend of the vehicle headlamp according to the invention.

The surface configuration of the aforementioned lens 12 is as shown in FIG. 4. That is, it is extended outwardly and upwardly as viewed in the direction of width of the vehicle body, and then curved backwardly. More specifically, the lens 12 is greatly curved backwardly as it comes near the outside end and the upper end thereof as viewed in the direction of width of the vehicle body.

At each of the parts of the outermost end (as viewed in the direction of width of the vehicle body) of the surface 12a of the lens 12, the direction (of the horizontal component N1) of the normal N of the aforementioned surface 12a is inclined an angle $\alpha$(=about 70°) with respect to the axial line L (which is in the same direction as the aforementioned optical axis Ax with the reflector 16 not tilted) of the vehicle body as viewed in the front-to-rear direction of the vehicle body. Furthermore at each of the part of the uppermost end 12c of the surface 12a of the lens 12, the direction (of the vertical component N2) of the normal N of the surface 12a is upwardly inclined at an angle $\beta$ (=about 70°) with respect to the aforementioned axial line L.

As is apparent from FIG. 2, the position of the outermost end 12b (as viewed in the direction of width of the vehicle body) of the lens 12 is substantially beside the light emitting section 18a of the discharge bulb 18.

An extension 22 is provided in front of the reflector 16 in such a manner as to surround the opening of the reflector 16.

The extension 22 is so designed that its front end is near the inner surface of the above-described lens 12.

The front end face 22a of the outside end portion (as viewed in the direction of width of the vehicle body) of the extension 22 is located slightly ahead of the outermost end 12b (as viewed in the direction of width of the vehicle body) of the aforementioned lens 12, and is substantially at the same position as the outermost end 16b (as viewed in the direction of width of the vehicle body) of the reflecting surface 16a of the reflector 16. Hence, the straight line A which connects the center of the light emitting section 18a of the discharge bulb 18 to the outermost end (as viewed in the direction of width of the vehicle body) of the reflector 16 is extended from the light emitting section 18a of the discharge bulb 18 towards the side of the vehicle lamp. The aforementioned front end 22a of the extension 22 is located near the straight line A, and the outermost end 12b of the lens 12 is located slightly behind the straight line A.

As shown in FIG. 2, the range which is defined by the angle θ between the straight line A and the straight line B which connects the center of the light emitting section 18a of the discharge bulb 18 to the rear end of the shade body 20a of the shade 20 is a sideward light advancing space which allows the passage of the direct light beam which advances sidewardly from the discharge bulb 18. The direct light beam passed through the sideward light advancing space irradiates outside slightly obliquely forwardly through the lens 12. In this operation, the direct light beam advancing forwardly which is undesirable in light distribution, is cut with the shade body 20a.

The headlamp 10, the embodiment, is a right headlamp, and is positioned at the right corner of the front of the vehicle body. Therefore, the direct light beam irradiates the region on the right side of the vehicle. Accordingly, the driver of the vehicle can see the right shoulder of the road.

Hence, with the vehicle headlamp with the discharge bulb according to the invention, the great power of the discharge bulb can be effectively utilized.

Furthermore, in the embodiment, the lamp 10A is provided at the corner of the front of the vehicle body, and the lighting circuit unit 28 adapted to turn on not only the lamp (10A) body but also the discharge bulb 18, is also mounted at the corner of the front of the vehicle body; that is, the space in the engine room is increased as much.

In the case where, as was described above, the lamp 10A is provided at the corner of the front of the vehicle body, in the engine room the region below the reflector 16 is liable to become a dead space. However, in the embodiment, the lighting circuit unit is fixedly mounted on the outer surface of the lower wall 14a of the lamp body 14, i.e., near and below the reflector 16. This feature makes it possible to effectively utilize the dead space in the engine room.

Moreover, in the embodiment, the surface configuration of the lens is curved upwardly and backwardly, (rearwardly) and the direction of the normal N at the uppermost end 12c of the surface 12a of the lens 12 is greatly inclined upwardly with respect to the axial line L (in the front-to-right direction of the vehicle body). Hence, in a roundish vehicle such as a sport car type vehicle, the lamp 10A can be mounted at the corner of the front of the vehicle body.

As was described above, the surface of the lens 12 is curved backwardly not only outwardly (as viewed in the direction of width of the vehicle body) but also upwardly. In this case, in the engine room, the region located below the reflector 16 is liable to become a great dead space. Hence, it is effective that, as in the embodiment, the lighting circuit unit 28 is fixedly mounted on the outer surface of the lower wall 14a of the lamp body 14 in such a manner that it is located below and near the reflector 16. In this case, since the outer surface of the lower wall 14a of the lamp body 14 is relatively large in area, the mounting region of the lighting circuit unit 28 on the outer surface of the lower wall 14a is wide; that is, the mounting of the lighting circuit unit is large in the degree of freedom.

The headlamp mounted on the left side of the vehicle body may have the same construction as the above-described headlamp 10, and may have the same effects and merits as the latter 10, the embodiment.

The headlamp 10, the embodiment of the invention, is the right headlamp of the four-lamp type headlamps. Since the lamp 10A is provided at the corner of the front end of the vehicle body, the two lamps 10A and 10B are shifted in the direction of front-to-rear direction of the vehicle body, and the lamp 10B located inside as viewed in the direction of width of the vehicle body is liable to have a dead space near and behind itself. Hence, although, in the embodiment, the lighting circuit unit 28 is provided below and near the reflector 16, the lighting circuit unit 28 may be provided near and behind the lamp 10B to effective utilize the dead space in the same way.

In the above-described embodiment, at each of the parts of the outermost end 12b (as viewed in the direction of width of the vehicle body) the angle α of inclination (of the horizontal component N1) of the normal N of the surface 12a of the lens 12 has substantially the same value (=70°). However, if the angle of inclination is more than 45° (preferably more than 60°), then at the aforementioned parts of the outermost end 12b, different angles of inclination may be employed. Similarly, in the above-described embodiment, at each of the parts of the uppermost end 12c, the angle β of inclination (of the vertical component N2) of the normal N of the uppermost end 12c of the surface 12a of the lens 12 has substantially the same value (=70°). However, if the angle of inclination is more than 45° (preferably more than 60°), then at the aforementioned parts of the uppermost end 12c, different angles of inclination may be employed.

What is claimed is:

1. A vehicle headlamp comprising:
    a discharge bulb;
    a reflector to reflect forwardly a light beam emitted from said discharge bulb; and
    a lens provided in front of said reflector, said lens having a surface which is curved outwardly, as viewed in the direction of width of a vehicle body, and which is curved rearwardly,
    wherein said surface includes a normal, at an outermost end of the outwardly and rearwardly curved surface of said lens, inclined greater than 45° outwardly with respect to an axial line which is extended in the front-to-rear direction of said vehicle body.

2. A vehicle headlamp as claimed claim 1, wherein
    a lighting circuit unit adapted to turn on said discharge bulb is arranged below and near said reflector.

3. A vehicle headlamp as claimed in claim 1, wherein said lens surface is curved upwardly and rearwardly, and at the uppermost end of the surface of said lens, the normal is upwardly inclined greater than 45° with respect to the axial line which is extended in the front-to-rear direction of said vehicle body.

4. A vehicle headlamp as claimed in claim 1, further comprising a shade disposed in front of said discharge bulb, and a sideward light passage space through which a direct light beam passes which advances sidewards from said discharge bulb is formed between said shade and the outermost end of width of said reflector.

5. A vehicle headlamp as claimed claim 1, wherein said lens is inclined greater than 60° outwardly with respect to the axial line which is extended in the front-to-rear direction of said vehicle body.

6. A vehicle headlamp as claimed claim 1, wherein said lens is inclined greater than 70° outwardly with respect to the axial line which is extended in the front-to-rear direction of said vehicle body.

7. A vehicle headlamp as claimed claim 4, wherein said shade comprises a cup-shaped shade body disposed in front of said discharge bulb and a leg extending backwardly from said shade body and secured to said reflector.

8. A vehicle headlamp as claimed claim 1, wherein the position of the outermost end of said lens is substantially beside the light emitting section of said discharge bulb.

9. A vehicle headlamp as claimed claim 1, further comprising an extension provided in front of said reflector in such a manner as to surround the opening of said reflector, and the front end face of the outside end portion of said extension is located slightly ahead of the outermost end of said lens, and is substantially at the same position as the outermost end of the reflecting surface of said reflector.

10. A vehicle headlamp as claimed claim 1, wherein a lighting circuit unit adapted to turn on said discharge bulb is mounted at the corner of the front of the vehicle body.

11. A vehicle headlamp as claimed claim 1, wherein a lighting circuit unit adapted to turn on said discharge bulb is fixedly mounted on the outer surface of the lower wall of said lamp body.

12. A vehicle headlamp as claimed claim 1, wherein a lighting circuit unit adapted to turn on said discharge bulb is disposed near and behind the lamp.

13. A vehicle headlamp comprising:

a discharge bulb;

a reflector to reflect forwardly light emitted from said discharge bulb;

a lens provided adjacent said reflector, said lens having a surface which is curved outwardly, as viewed in a direction of width of a vehicle body, and which is curved rearwardly;

a shade disposed in front of said discharge bulb, said shade being opaque so as to block a first portion of light, emitted from said discharge bulb, from passing through said lens; and a sideward light-passage space through which a second portion of light emitted from said discharge bulb passes and advances sideward such that said second portion of light passes through the rearwardly curved surface of said lens without impinging on either said reflector or said shade.

14. A vehicle headlamp as claimed in claim 13, wherein said lens includes a surface which is curved outwardly as viewed in the direction of width of a vehicle body and rearwardly, a normal at the outermost end of said lens surface being inclined greater than 45° outwardly with respect to an axial line which extends in the front-to-rear direction of said vehicle body.

15. A vehicle headlamp as claimed in claim 13, wherein said lens includes a surface which is curved upwardly and rearwardly, and at the uppermost end of the surface of said lens, the normal is upwardly inclined greater than 45° with respect to an axial line which extends in the front-to-rear direction of said vehicle body.

16. A vehicle headlamp as claimed in claim 1, wherein said discharge bulb includes a light emitting section, and said reflector includes a reference surface which is a substantially rotary paraboloid, and wherein said light emitting section of said discharge bulb is located slightly before the focal point of said substantially rotary paraboloid.

17. A vehicle headlamp according to claim 1, wherein an outermost end of said reflector, as viewed in the direction of width of said vehicle body, is positioned backward relative to a tip of said discharge bulb in the front-to-rear direction.

18. A vehicle headlamp comprising:

a discharge bulb;

a reflector adapted to reflect forwardly light emitted from said discharge bulb;

a lens provided adjacent said reflector;

a shade disposed in front of said discharge bulb, said shade being opaque so as to block a first portion of light, emitted from said discharge bulb, from passing through said lens; and a sideward light-passage space through which a second portion of light emitted from said discharge bulb passes and advances sideward such that said second portion of light passes through said lens without impinging on either said reflector or said shade, wherein the discharge bulb is adjacent to an outermost portion, as viewed in the direction of width of a vehicle body, of said headlamp.

19. The vehicle headlamp as claimed in claim 18, further comprising at least two bulbs.

* * * * *